United States Patent [19]
Basconi

[11] Patent Number: 4,644,099
[45] Date of Patent: Feb. 17, 1987

[54] UNDERCARPET CABLE

[75] Inventor: Paul D. Basconi, Hamden, Conn.

[73] Assignee: Allied Corporation, Morris Township, Morris County, N.J.

[21] Appl. No.: 722,048

[22] Filed: Apr. 11, 1985

[51] Int. Cl.$^4$ .............................................. H01B 7/08
[52] U.S. Cl. ............................ 174/117 F; 174/70 C; 174/115; 174/117 R
[58] Field of Search ................... 174/10, 70 C, 117 F, 174/117 FF, 115, 117 R

[56] References Cited

U.S. PATENT DOCUMENTS

| | | | |
|---|---|---|---|
| 1,969,764 | 8/1934 | Soutter, Jr. | 174/10 |
| 2,581,472 | 1/1952 | Dudley et al. | 174/117 F |
| 2,831,049 | 4/1958 | Cabral | 174/117 F |
| 3,775,552 | 11/1973 | Schumacher | 174/105 R |
| 4,041,237 | 8/1977 | Stine et al. | 174/10 X |
| 4,404,425 | 9/1983 | Rich | 174/107 |
| 4,419,538 | 12/1983 | Hamsell, III | 174/117 |
| 4,467,138 | 8/1984 | Brorein | 174/115 |
| 4,488,125 | 12/1984 | Gentry et al. | 174/115 X |

FOREIGN PATENT DOCUMENTS

| | | | |
|---|---|---|---|
| 123417 | 10/1984 | European Pat. Off. | 174/117 F |
| 8009895 | 7/1980 | Fed. Rep. of Germany . | |
| 215873 | 5/1924 | United Kingdom | 174/70 G |
| 1552455 | 9/1979 | United Kingdom . | |

OTHER PUBLICATIONS

Miller, Arley K.; "Cutting the Crosstalk"; Machine Design; May 9, 1985; vol. 57, No. 10, p. 86.
IPC-FC-211, "Specification for Flat Undercarpet Data Transmission Cable," Institute for Interconnecting and Packaging Electronic Circuits, 1984.

*Primary Examiner*—Arthur T. Grimley
*Assistant Examiner*—Morris H. Nimmo
*Attorney, Agent, or Firm*—James Riesenfeld; Roger H. Criss

[57] ABSTRACT

An undercarpet cable comprises a signal-carrying core surrounded by a jacket having a rectangular cross section. Adjoining the jacket on opposite sides are two tapered side members that are easily peeled from the jacket to facilitate attaching a connector to the jacketed core.

8 Claims, 2 Drawing Figures

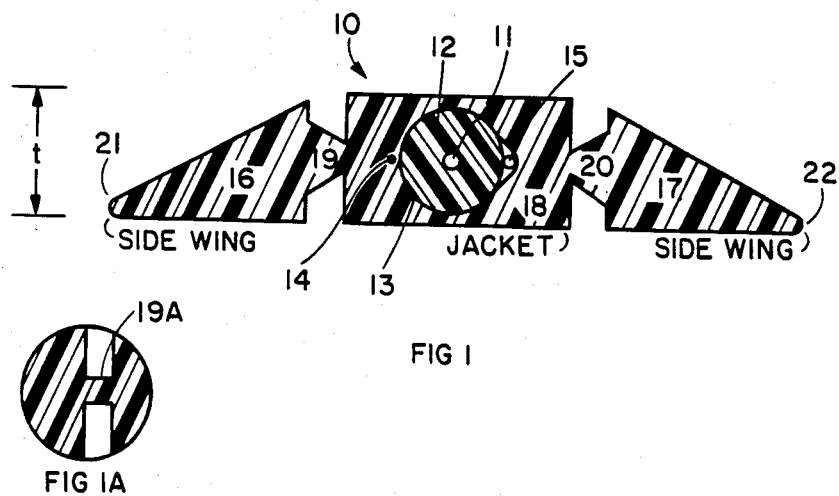
FIG 1
FIG 1A
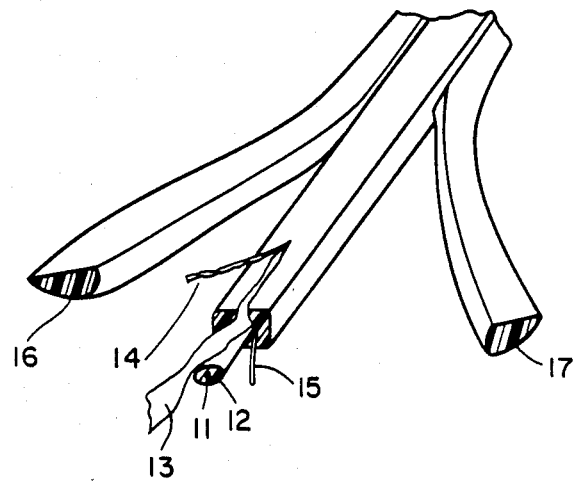
FIG 2

UNDERCARPET CABLE

BACKGROUND OF THE INVENTION

1. Field of the Invention

This invention relates to an undercarpet cable and, more particularly, to a cable having a rectangular-cross section central region that is easily separated from triangular-cross section wings.

2. Description of the Prior Art

It is often convenient when installing cable for data transmission to pass the cable under carpeting, rather than through walls, ducts, etc. However, to be suitable for undercarpet installation, the cable should be flat and have tapered edges.

U.S. Pat. No. 4,404,425, issued Sept. 13, 1983, to Rich, discloses an undercarpet cable having a trapezoidal-shaped cross section.

U.S. Pat. No. 4,419,538, issued Dec. 6, 1983, to Hansell, discloses an undercarpet cable having a central section that contains the conductor and side sections to carry stress.

U.S. Pat. No. 4,467,138, issued Aug. 21, 1984, to Brorein, discloses a communication wire that has jacketed pairs of twisted wires on opposite sides of, and parallel to, a jacketed central steel wire. Weakening lines permit the twisted wires to become separated from the central wire, while maintaining an intact jacket on each part.

A variety of undercarpet cables were disclosed in IPC-FC-211, "Specification for Flat Undercarpet Data Transmission Cable," Institute for Interconnecting and Packaging Electronic Circuits, 1984.

None of the undercarpet cables of the prior art are both easily stripped and readily terminated.

SUMMARY OF THE INVENTION

In accordance with the present invention, an electrical cable for undercarpet use comprises (a) an elongated core surrounded by a jacket having a rectangular cross section, and (b) two elongated side members disposed on opposite sides of the jacketed core, each side member having a generally triangular cross section, including (i) a substantially flat bottom, substantially colinear with the bottoms of the jacket and the other side member, (ii) a side, which is generally adjacent to the jacket and normal to the bottom, and which is joined to the jacket by a longitudinal section that is adapted to be easily severed to separate the side member from the jacket, and (iii) a generally tapered top, which extends from the top of the side to the bottom.

The cable provides the smooth flat profile desired for undercarpet use. At the same time, the side members are easily removed to provide a rectangular cross section that is well-adapted for terminating in a connector.

BRIEF DESCRIPTION OF THE DRAWINGS

FIG. 1 is a cross section of an embodiment of the present invention. FIG. 1A is a detailed alternative cross-sectional view of a part of another embodiment of this invention.

FIG. 2 is a perspective view of an embodiment of the present invention.

DETAILED DESCRIPTION OF THE INVENTION

Passing cables under carpet provides clear advantages over passing them through walls, ducts, etc. Undercarpet cable makes easier both the initial cable installation and later changes. It is important that undercarpet cable be flat and have a smooth profile, lest if be unsafe, unsightly, or both. The cable of the present invention is flat, with side wings to provide a smooth profile.

The present cable is adapted for easy termination in a connector. The cable has side wings that are easily peeled away from the central core, which has a rectangular-cross section jacket that lends itself to easy termination. In an alternative embodiment, the jacket surrounding the central core has embedded in it a rip cord. By peeling the rip cord, the jacket is torn to expose the core. Typically, the core comprises a conductor with a dielectric around it and has a drain wire and/or a shield adjoining it.

FIG. 1 shows the coaxial cable structure 10 of an embodiment of the present invention in cross section. A conductor 11 is surrounded by a dielectric 12 and conductive shield 13. Longitudinally displaced from, and coplanar with, the conductor are rip cord 14 and drain wire 15. Side wings 16 and 17 are joined to the central rectangular jacket section 18 by longitudinal sections 19 and 20, respectively. Longitudinal sections 19 and 20 are preferably tapered inwardly toward the jacket, as shown in FIG. 1, but may also be rectangular, with their long dimension substantially parallel to the bottom of the jacket as shown by section 19A in FIG. 1A. In either case, the longitudinal sections are readily severed for separating wings 16 and 17 from jacket 18. Rounded vertices 21 and 22 form the outer edges of wings 16 and 17, respectively.

FIG. 2 shows a perspective view of an end of a cable after the longitudinal sections 16 and 17 have been severed along a length of the cable, and the rip cord 14 has been pulled back along part of that length.

The materials from which the present cable are fabricated are all conventional. Thus, the conductor 11 would typically be tinned copper or other suitable material, with the gauge chosen to provide the desired impedance. The dielectric 12 may be foamed or solid polyethylene, polypropylene, or other material known in the art. The shield 13 may be aluminized polyester, and drain wire 15 could be any suitable conductor, such as tinned copper. The rectangular jacket 18 may be polyvinyl chloride or other suitable material. Preferably, the wings 16 and 17 and longitudinal sections 19 and 20 are of the same material as jacket 18 and are all fabricated as a single unit. Preferably, the jacket thickness t is less than about 2.3 mm, to permit inconspicuous installation. The flat top surface of the jacket provides the primary load-bearing surface.

I claim:

1. An electrical cable for undercarpet use comprising:
   (a) an elongated electrically conductive core surrounded by an electrically insulating jacket having a rectangular cross section including a top and a bottom, and
   (b) two elongated side members disposed on opposite sides of the jacketed core, each side member having a generally triangular cross section, including (i) a substantially flat bottom, substantially colinear with the bottom of the jacket and the substantially flat bottom of the other side member, (ii) a side, normal to its substantially flat bottom, which side is generally adjacent to the jacket and joined to the jacket by a longitudinal section that is adapted to be easily severed to separate the side member from the jacket, and (iii) a generally tapered top, which extends from the top of the side to the substantially flat bottom.

2. The cable of claim 1 in which each longitudinal section has a tapered cross section, with minimum thickness at its contact with the jacket.

3. The cable of claim 1 in which each longitudinal section has a substantially rectangular cross section, with the long dimension of the rectangle substantially parallel to the bottom of the jacket.

4. The cable of claim 1 in which the top of each side member joins the substantially flat bottom of the side member in a rounded vertex.

5. The cable of claim 1 further comprising an elongated rip cord embedded in the jacket in such a way that the jacket may be torn by pulling on the rip cord.

6. The cable of claim 1 in which the core comprises a central conductor, surrounded by a conductive shield, from which it is separated by a dielectric.

7. The cable of claim 6 further comprising an elongated conductive drain wire, electrically connected to the shield and disposed substantially coplanar with the central conductor.

8. The cable of claim 7 further comprising an elongated rip cord, substantially coplanar with the central conductor and the drain wire and embedded in the jacket in such a way that the jacket may be torn by pulling on the rip cord.

* * * * *